United States Patent [19]
Komatsu et al.

[11] Patent Number: 5,560,331
[45] Date of Patent: Oct. 1, 1996

[54] CYLINDER HEAD FOR ENGINE

[75] Inventors: Kenji Komatsu; Tomotaka Takano, both of Iwata, Japan

[73] Assignee: Yamaha Hatsudoki Kabushiki Kaisha, Iwata, Japan

[21] Appl. No.: 559,080

[22] Filed: Nov. 16, 1995

Related U.S. Application Data

[62] Division of Ser. No. 438,502, May 10, 1995.

[30] Foreign Application Priority Data

May 10, 1994 [JP] Japan .................................. 6-096671

[51] Int. Cl.⁶ ............................................. F02F 7/00
[52] U.S. Cl. .................... 123/193.5; 123/195 C
[58] Field of Search ............................ 123/193.5, 193.3, 123/184.21, 90.27, 195 C

[56] References Cited

U.S. PATENT DOCUMENTS

| | | |
|---|---|---|
| 2,227,247 | 12/1940 | Conover . |
| 2,322,961 | 6/1943 | Yingling . |
| 2,496,434 | 2/1950 | Bosma . |
| 2,691,954 | 10/1954 | Shively . |
| 2,766,739 | 10/1956 | Kosche ............................ 123/90.27 |
| 2,968,292 | 1/1961 | Kelly . |
| 2,990,819 | 7/1961 | Bouvy . |
| 3,494,334 | 2/1970 | Johnson . |
| 3,521,613 | 7/1970 | Celli ................................. 123/90.27 |
| 3,692,006 | 9/1972 | Miller et al. . |
| 3,772,887 | 11/1973 | Ziegler . |
| 3,921,398 | 11/1975 | Kashmerick . |
| 3,973,548 | 8/1976 | Celli ................................. 123/195 C |
| 4,082,068 | 4/1978 | Hale . |
| 4,302,935 | 12/1981 | Cousimano ..................... 123/193.5 |
| 4,328,770 | 5/1982 | Hale . |
| 4,343,270 | 8/1982 | Kawabe . |
| 4,382,796 | 5/1983 | Blanchard . |
| 4,401,061 | 8/1983 | Matsushita et al. . |
| 4,452,194 | 6/1984 | Watanabe et al. . |
| 4,621,595 | 11/1986 | Suzuki . |
| 4,671,222 | 6/1987 | Gallot et al. ..................... 123/90.27 |
| 4,993,374 | 2/1991 | Okui ................................. 123/90.27 |
| 5,184,582 | 2/1993 | Okui et al. ....................... 123/90.27 |
| 5,385,125 | 1/1995 | Oyaizu et al. ................... 123/90.27 |

FOREIGN PATENT DOCUMENTS

| | | |
|---|---|---|
| 981135 | 1/1976 | Canada . |
| 1571361 | 5/1969 | France . |
| 675606 | 3/1939 | Germany . |
| 4038169 | 6/1992 | Germany . |
| 5156641 | 5/1975 | Japan . |
| 58-44213 | 3/1983 | Japan . |
| 2030218 | 4/1980 | United Kingdom . |
| 2057380 | 4/1981 | United Kingdom . |
| 2204094 | 11/1988 | United Kingdom . |

OTHER PUBLICATIONS

Johnson Service Manual (1977) pp. 5–1 through 5–22 plus 9.9/15 HP Water Flow Diagram.
Merc 50 Parts Manual (Aug. 1979).
Merc 40 Parts Manual (Jul. 1979).
Yamaha '80 Parts Manual (Sep. 1979).

Primary Examiner—Marguerite McMahon
Attorney, Agent, or Firm—Knobbe, Martens, Olson & Bear

[57] ABSTRACT

A number of embodiments of cylinder head constructions for internal combustion engines, wherein the intake and exhaust passages extend through the cylinder head and terminate in the respective upper and lower surfaces of the cylinder head so as to simplify machining. A number of variations and manifolding arrangements are also disclosed so as to permit the installation of the engine into an engine compartment and to provide a compact construction.

3 Claims, 14 Drawing Sheets

CYLINDER HEAD FOR ENGINE

This application is a divisional of U.S. patent application No. 08/438,502, filed May 10, 1995.

BACKGROUND OF THE INVENTION

This invention relates to a cylinder head for an engine and more particularly to an improved cylinder head porting arrangement and associated manifold system for an internal combustion engine.

As is well know, engines normally have a cylinder block in which the cylinder bores are formed and a cylinder head which is detachable connected to the cylinder block and which has surfaces or recesses that cooperate with the cylinder bores to form the combustion chambers of the engine. With overhead valve engines, the intake and exhaust passages are formed in the cylinder head and extend from the combustion chamber surface in the sealing face of the cylinder head to external openings in the cylinder head to which intake and/or exhaust manifolds are connected. The cylinder head also has a valve chamber which is closed by a valve cover that is affixed to the cylinder head and which is removable for servicing the valve mechanism and the camshafts, if overhead camshafts are employed. Hence, there are a number of surfaces on the exterior of the cylinder head which must be machined so as to improve sealing.

Frequently, particularly with automotive applications, the intake passages terminate on one side of the cylinder head and the exhaust passages terminate on the other side of the cylinder head. The lower surface must be machined to provide the sealing surface for the cylinder block and the upper surface of the cylinder head must be machined to form the sealing surface for the valve cover. In addition, the surfaces around the intake and exhaust passages where they exit the cylinder head also must be machined so as to permit good sealing with the intake and exhaust manifold. Obviously, this requires complicated machining operations.

It is therefore, a principal object of this invention to provide an improved cylinder head arrangement for an internal combustion engine.

It is a further object of this invention to provide an improved cylinder head arrangement for an internal combustion engine wherein the surfaces of the intake and exhaust passages which must be machined lie in the same plane as the lower and upper sealing surfaces of the cylinder so as to facilitate and simplify machining operations.

With the induction system for an internal combustion engine, it is well known that the length of the induction system can be tuned to certain running conditions so as to provide optimum charging efficiency. Frequently this requires a long intake passage. However, when the engine is employed for powering a vehicle, such as an automobile, the spaced available in the engine compartment may not permit the use of long intake passages.

It is, therefore, a still further object of this invention to provide an improved compact induction system for an engine that permits the attainment of long lengths in relatively small volumetric areas.

In connection with the induction system for an engine, it is desirable to maintain a relatively straight unencumbered flow path to achieve high performance and good volumetric efficiencies at wide-open throttle conditions. However, it is also desirable to induce turbulence in the combustion chamber, particularly at low speed and low load conditions. There have been proposed types of flow control valves in the intake passage of the cylinder head which can be utilized to permit low restriction under high speed, high load operation, and also the attainment of turbulence under low speed, low load conditions.

However, in order to be able to achieve this result, it is necessary that the control valve be positioned relatively close to the intake port. This presents certain problems, and can significantly complicate the configuration of the cylinder head, if the flow control valve is positioned directly in the cylinder head.

It is, therefore, a still further object of this invention to provide a compact cylinder head assembly wherein a flow control valve can be positioned in the assembly but apart from the cylinder head, per se.

SUMMARY OF THE INVENTION

A first feature of the invention is adapted to be embodied in a cylinder head for an internal combustion engine having a lower surface for sealing engagement with a cylinder block having a cylinder bore closed by the cylinder head lower surface to form a combustion chamber. The cylinder head has an upper surface spaced from the lower surface and which surrounds a valve chamber and is adapted to be closed by a valve cover sealingly engaged with the upper surface. An intake passage extends through the cylinder head from an intake port in the combustion chamber to an inlet opening surrounded by a sealing surface that is co-planar with one of the upper and lower surfaces. An exhaust passage extends through the cylinder head from an exhaust port in the combustion chamber to an outlet opening surrounded by a sealing surface that is co-planar with the other of these surfaces.

Another feature of the invention is adapted to be embodied in a cylinder head assembly for an internal combustion engine comprised of a cylinder head having a lower surface for sealing engagement with a cylinder block and having a cylinder bore closed by the cylinder head lower surface to form a combustion chamber. The cylinder head has an upper surface that surrounds a valve chamber and which is adapted to be closed by a valve cover sealingly engaged with the upper surface. A flow passage extends through the cylinder head from the combustion chamber to the upper surface. A cover is affixed to the cylinder head upper surface and has a flow passage that is aligned with the cylinder head flow passage. The cover supports a flow control valve for controlling the flow through the flow passage.

DETAILED DESCRIPTION OF THE PREFERRED EMBODIMENTS OF THE INVENTION

Figure 1:
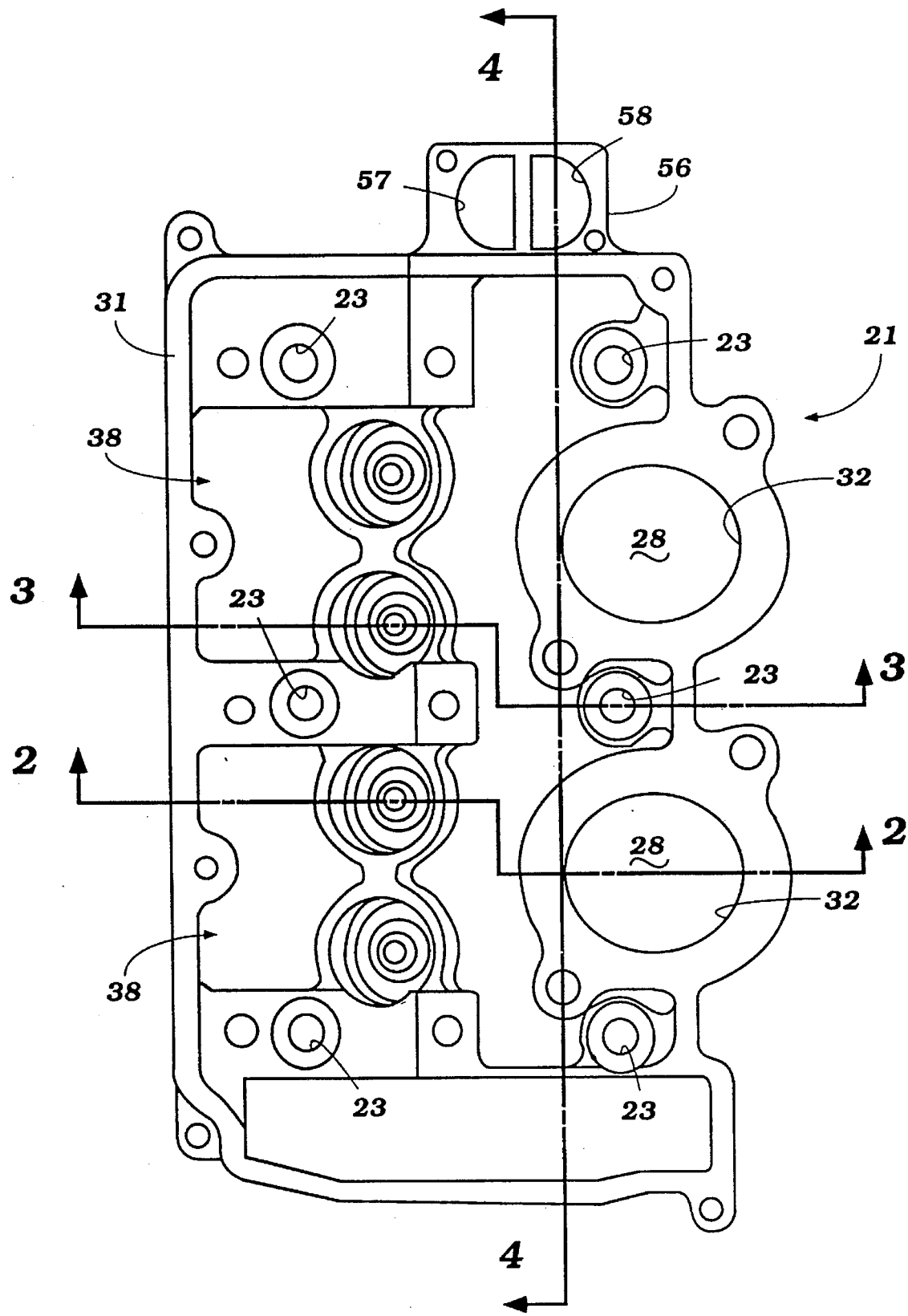
FIG. 1 is a top plan view of a cylinder head constructed in accordance with a first embodiment of the invention.
Figure 2:
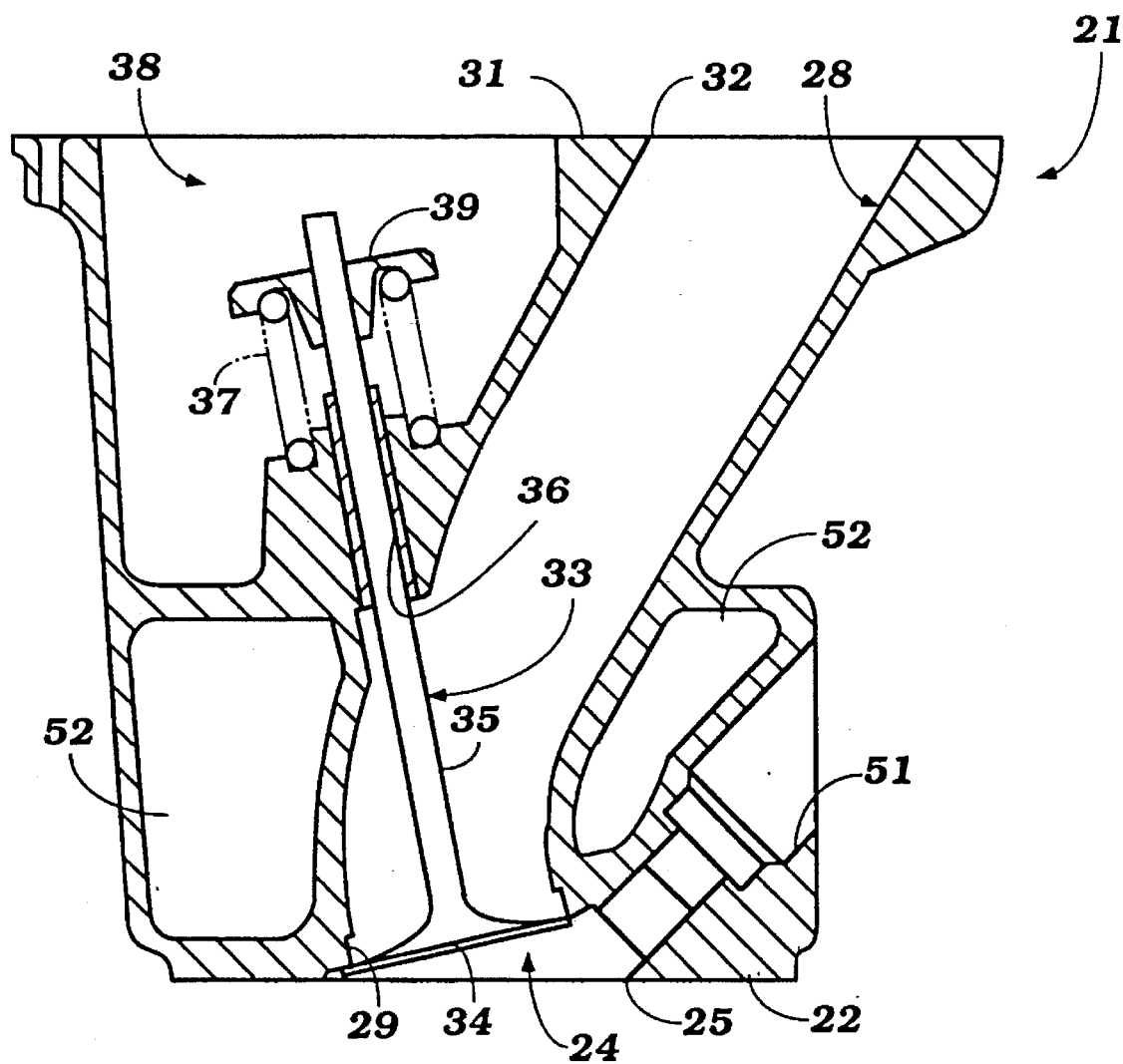
FIG. 2 is a cross-sectional view taken along the line 2—2 of FIG. 1 and shows the configuration of the intake passage of one cylinder of the engine.

Referring now in detail to the drawings and initially to the embodiment of FIGS. 1–5, a cylinder head constructed in accordance with this embodiment of the invention is identified generally by the reference numeral 21. The cylinder head 21 is formed as a casting from a light weight material, such as aluminum or aluminum alloy. Of course, the particular material from which the cylinder head 21 is cast is within the scope of those skilled in the art and generally forms no part of the invention.

The cylinder head 21, in the illustrated embodiment, is designed for use either in a two cylinder-engine or for one bank of a V-4 engine. Although the invention is described in conjunction with such a number of cylinders and such alternative cylinder arrangements, it will be readily apparent to those skilled in the art how the invention may be practiced with engines having other numbers of cylinders and other cylinder orientation.

The cylinder head 21 has a lower surface 22 that is adapted to be brought into sealing engagement with an associated cylinder block (not shown in these figures) and is affixed thereto in a known manner, as by threaded fasteners which pass through openings 23 formed in the cylinder head 21. Combustion chamber recesses 24 are formed in the cylinder head surface 22 and are surrounded by portions of the surface 22 that are in sealing engagement with the associated cylinder block or a cylinder head gasket interposed therebetween. The recesses 24 are comprised of a first generally wedge-shaped portion 25 with squish areas 26 and 27 being formed on opposite sides thereof.

In the illustrated embodiment, the cylinder head 21 is of a two-valve-per-cylinder engine, although as should be readily apparent to those skilled in the art, the features of the invention may be embodied with engines having multiple valves per cylinder.

An intake passage, indicated generally by the reference numeral 28, extends from the combustion chamber recess 24 and specifically an intake valve seat 29 formed in registry with this recess to an upper surface 31 of the cylinder head where it terminates in an inlet opening 32 that is coextensive with the upper surface 31. An intake valve, indicated generally by the reference numeral 33, is provided with a head portion 34 which cooperates with the valve seat 29 for controlling the flow through the intake passage 28 from the inlet opening 32 to the combustion chamber recess 24. A stem portion 35 of the intake valve 33 is slidably supported within a valve guide 36 that is pressed or cast into the cylinder head casting 21.

A coil compression spring 37 encircles the upper portion of the valve stem 35 within a valve chamber 38 that is formed in the cylinder head 21. The valve chamber 38 is surrounded by the upper cylinder head surface 31. The surface 31 may, in a preferred form of the invention, extend generally parallel to the lower sealing surface 32.

The coil compression spring 37 acts against a keeper retainer assembly 39 so as to normally urge the intake valves 33 to their closed position. The intake valves 33 are operated, for example, by means of an overhead camshaft, which is mounted within the valve chamber 38 in a known manner. Later figures will show embodiments of how this can be accomplished.

Figure 3:
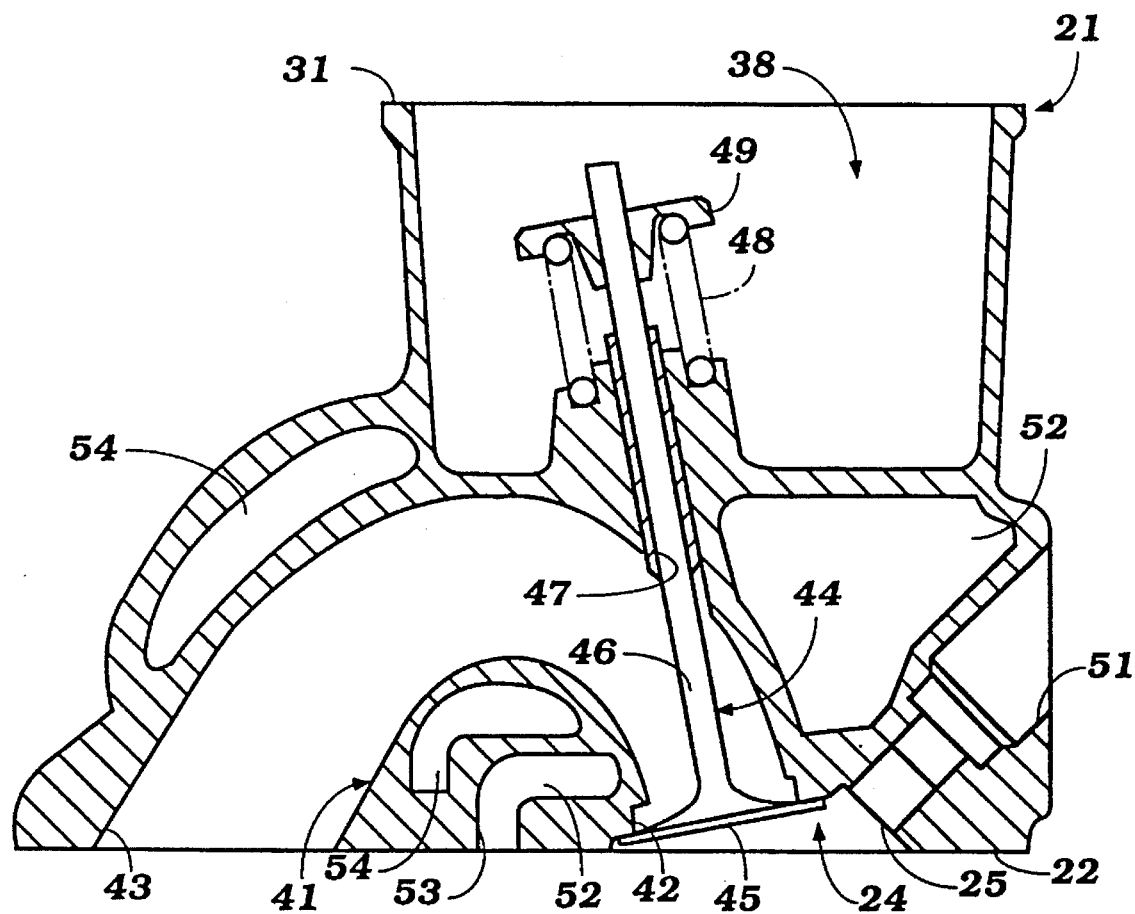
FIG. 3 is a cross-sectional view taken along the line 3—3 of FIG. 1 and shows the exhaust passage of the other cylinder of the engine.
Figure 4:
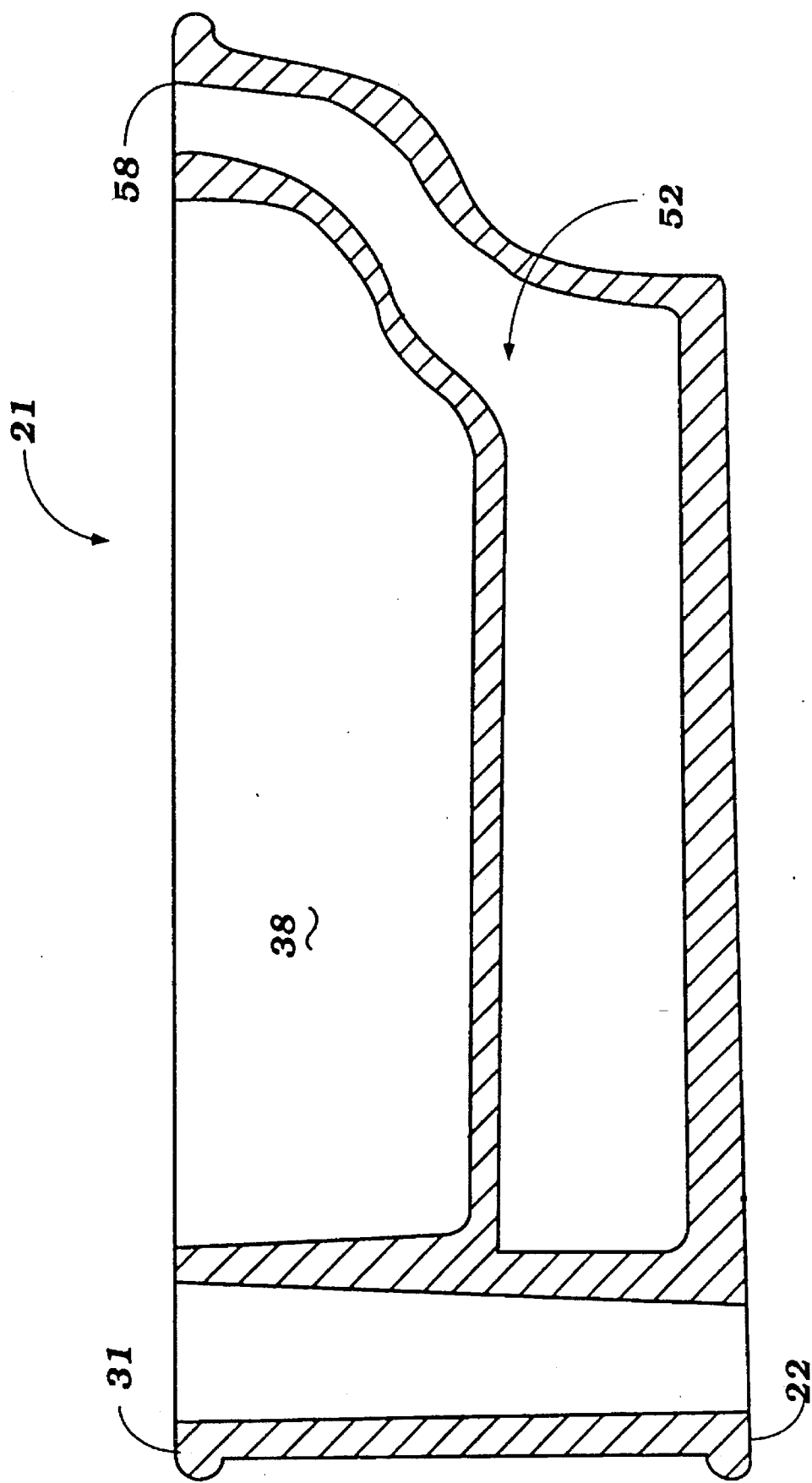
FIG. 4 is a cross-sectional view taken along the line 4—4 of FIG. 1.

Referring now to FIG. 3, there are provided exhaust passages 41 which also extend through the cylinder head casting 21. The exhaust passages 41 begin at exhaust valve seats 42 formed in the cylinder head recesses 24 and which curve in a re-entrant fashion so as to exit the lower cylinder head surface 22 through an exhaust passage outlet opening 43. It will be seen that the outlet opening 43 is surrounded by the surface 22 of the cylinder head and hence is coextensive with it.

Exhaust valves, indicated generally by the reference numeral 44, have head portions 45 that cooperate with the exhaust valve seats 42 so as to control the opening and closing of the exhaust passages 41. The exhaust valves 44 have stem portions 46 that are slidably supported in valve guides 47 that are pressed or otherwise fixed in the cylinder head casting 21. Coil compression springs 48 encircle the upper ends of the exhaust valve stems 46 that extend in the valve chamber 38. These valve springs 48 act against keeper retainer assemblies 49 so as to urge the exhaust valves 44 to their closed position. The exhaust valves 44 are opened by the same camshaft, in a preferred form, that operates the intake valves 33. As noted above, this camshaft will be shown in later figures.

The exhaust outlet openings 43 are spaced .preferably transversely outwardly from the cylinder block and cooperate with an exhaust manifold (not shown in these figures) for collecting the exhaust gases and delivering them to an appropriate exhaust system. Later embodiments will show how this can be done. Since the surfaces surrounding the exhaust outlet openings 43 are coplanar with the cylinder head sealing surface 22, and in fact may form an extension of it, they can be easily machined.

In a like manner, a cam cover (not shown) sealingly engages the upper cylinder head surface 31 for enclosing the valve chamber 38. An intake manifold (not shown in these figures) may cooperate with the intake passages 28 and specifically their inlet openings 32 for delivering an air and/or fuel charge to these intake passages 28. This intake manifold may be separate from the cam cover or, in some instances, may be formed in part by it, as will be described in conjunction with later embodiments.

The side of the cylinder head casting 21 opposite to the exhaust passages 41 is provided with pairs of spark plug receiving openings 51, each aligned with a respective one of the intake valves 33 and exhaust valves 44 for each cylinder. Spark plugs are received in these recesses and are fired in a known manner by a suitable ignition system. Of course, although two spark plug recesses 51 are illustrated, either single spark plug recesses or greater numbers may be provided, depending upon the particular design.

The cylinder head 21 is adapted to be employed in conjunction with a cylinder block of any known type, and later embodiments will illustrate how the cylinder head 21 can be employed with various types of cylinder blocks. In addition, the cylinder head 21 is provided with a liquid cooling jacket through which coolant is circulated. Unlike conventional engines, however, the cylinder head casting 21 is provided with a first series of intake cooling jackets 52 which surround and primarily serve the intake passages 28. These intake passage cooling jackets 52 receive water from the cylinder block cooling jacket through a plurality of openings 53 that are formed in the lower cylinder head surface 22.

In a like manner, the exhaust passages 41 are provided with respective exhaust cooling jackets 54 which primarily encircle the exhaust passages 41. These exhaust cooling jackets 54 receive coolant from the cylinder block cooling jacket through passages 55 formed in the surface 22 and which are spaced from the inlet passage coolant openings 53. By providing relatively separate cooling jackets 52 and 54 for the intake passages 28 and exhaust passages 41, respectively, it is possible to maintain either a different effective temperature for the intake passages than the exhaust passages of independent cooling. As a result, the intake passages 28 may be maintained at a lower temperature than if the coolant is mixed.

The rear end of the cylinder head 21 is provided with a boss 56 (FIG. 1) that has an exhaust coolant passage discharge opening 57 and an intake coolant passage discharge opening 58. These openings 57 and 58 communicate with a return passage (not shown) which may then mix the fluids at this point.

Figure 6:
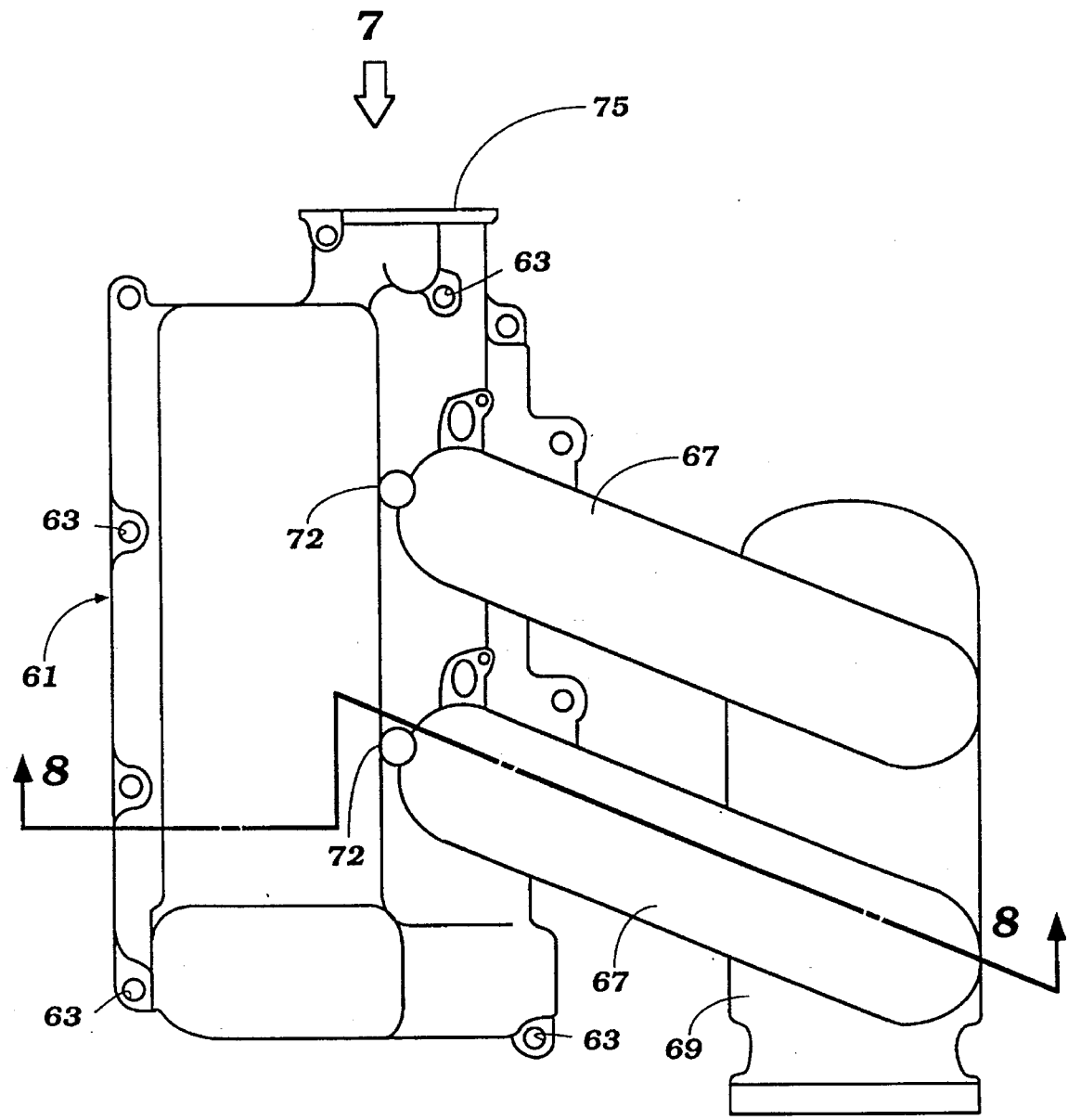
FIG. 6 is a top plan view of a cylinder head with attached cam cover constructed and intake manifold in accordance with a further embodiment of the invention.
Figure 7:
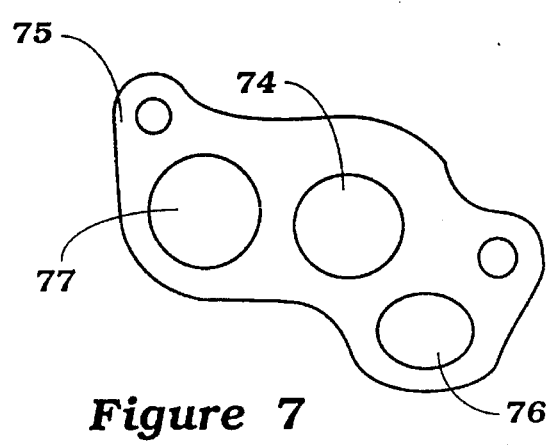
FIG. 7 is an end view taken in the direction of the arrow 7 in FIG. 6.
Figure 8:
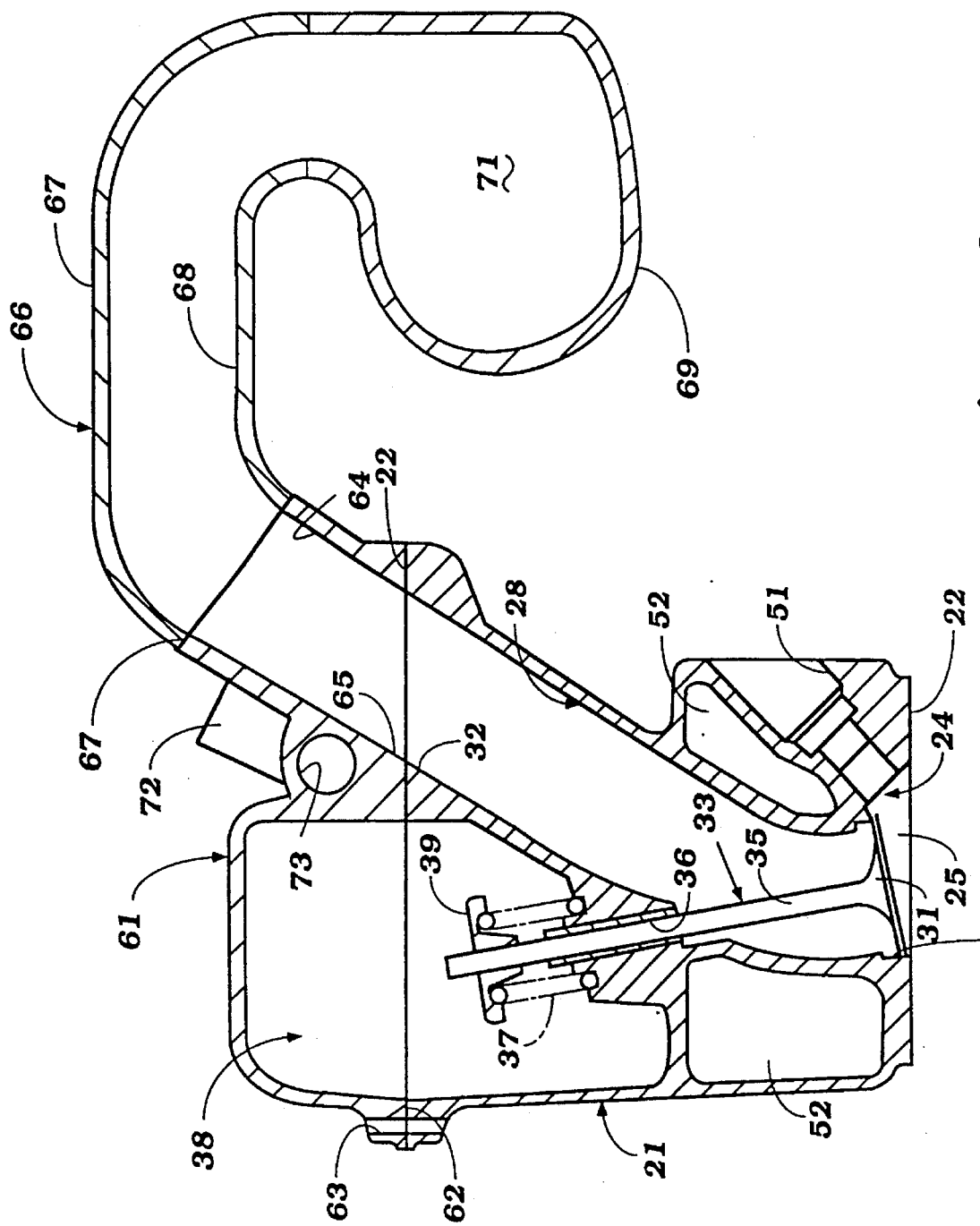
FIG. 8 is a cross-sectional view taken along the line 8—8 of FIG. 6.

As has been noted, a cam cover, which may or may not form a portion of the intake manifold, is affixed to the cylinder head casting 21 in engagement with its sealing surface 31 to enclose the cam chamber 38. FIGS. 6–8 show a specific embodiment of the invention wherein such a cam cover is employed, and it is identified generally by the reference numeral. 61. Since the cylinder head 21 is of the type previously described, it is only shown partially in FIG. 8 and where components are the same, they have been identified by the same reference numerals and will not be described again, except insofar as is necessary to understand the construction and operation. Since the cam cover 61 functions to provide a portion of the induction system, the cross-sectional view of FIG. 8 is taken through one of the intake passages 28. Therefore, this view is generally similar to that of FIG. 2, but shows, as noted, the cam cover arrangement.

It should be noted that the cam cover 61 has a lower surface 62 that is brought into sealing engagement either with the cylinder head upper surface 22 or an interposed gasket. Openings 63 formed in the cam cover 64 and cylinder head casting 21 accommodate fasteners for affixing the cam cover 61 in place. In this position, it will be seen that the valve chamber 38 is closed.

The cam cover 61 is provided with a pair of intake passages 64 which have outlet openings 65 that register with the inlet openings 32 of the cylinder head intake passages 28 so as to provide a smooth flow passage therebetween.

An intake manifold assembly, indicated generally by the reference numeral 66, is detachably affixed to a surface 67 of the cam cover 61 through which the inlet openings 64 pass. The manifold 66 has runner sections 67 that define passages 68 that communicate with the cam cover intake passages 64 and, accordingly, with the cylinder head intake passages 28.

A plenum chamber 69 having an internal volume 71 serves the manifold runner passages 68. An atmospheric air inlet opening (not shown) is formed at the front side of the plenum chamber 69 and communicates with the atmosphere through an air inlet device in which a throttle valve may be positioned for controlling the engine speed.

The cam cover 61 is provided with bosses 72 adjacent its intake passage portion 64 which may be drilled and, if desired, tapped so as to receive fuel injectors (not shown) that spray fuel into the cam cover intake passages 64 for distribution to the combustion chamber recesses 24 of the cylinder head 21 through its intake passages 28. A longitudinally extending fuel manifold 73 can be formed integrally in the cam cover 61 and terminates in an inlet opening 74 formed in a flange 75 formed at the rear face thereof. Hence, this arrangement eliminates the necessity of providing separate fuel rails for delivering fuel to the fuel injector.

The flange 75 may also be provided with water discharge or inlet passages 76 and 77 which communicate with the intake and exhaust coolant jacket outlet openings 58 and 57, respectively, of the cylinder head boss 56 so as to eliminate additional external fittings.

Figure 9:
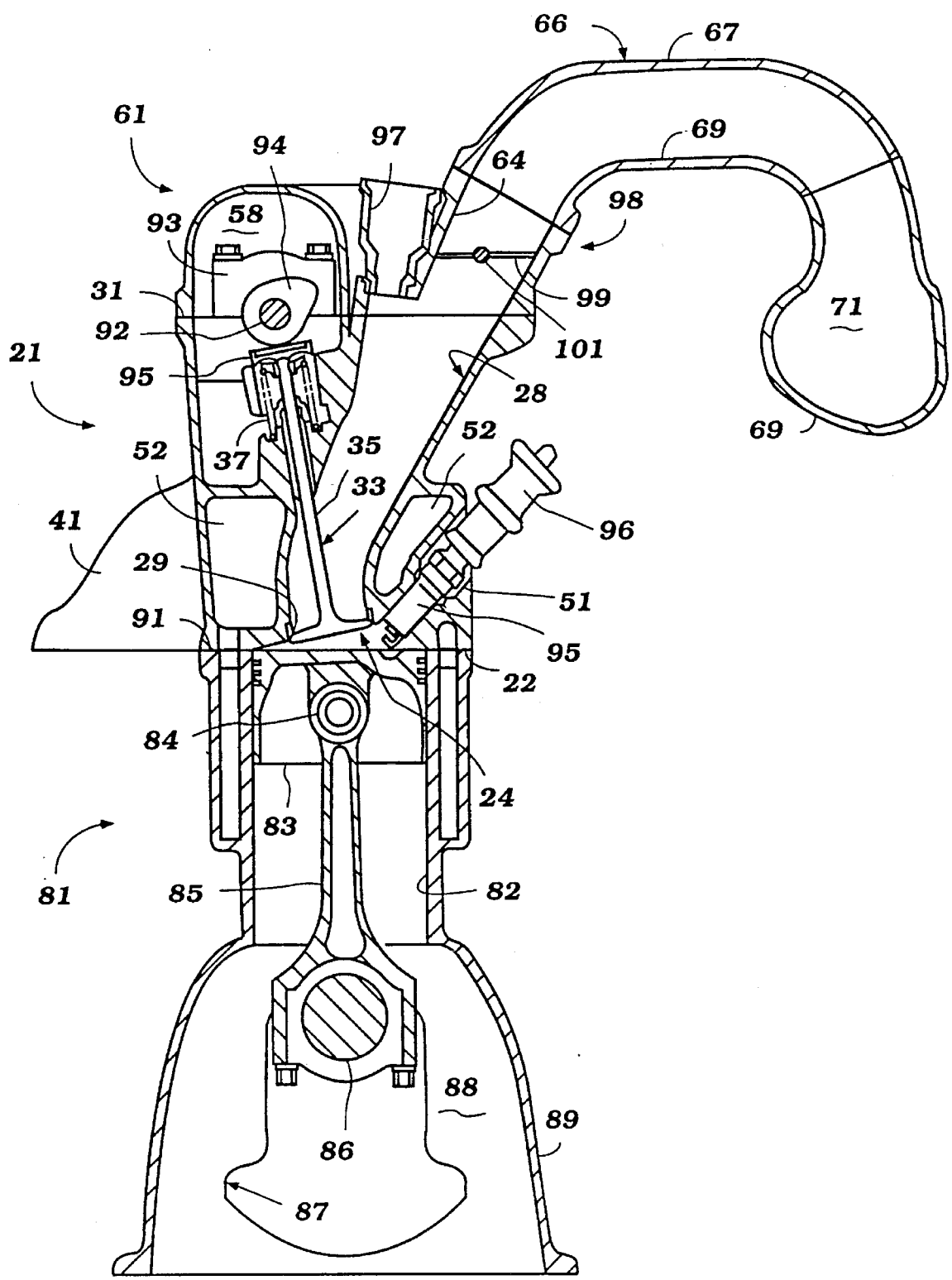
FIG. 9 is a partial cross-sectional view taken through a single cylinder of an engine constructed in accordance with another embodiment of the invention.
Figure 10:
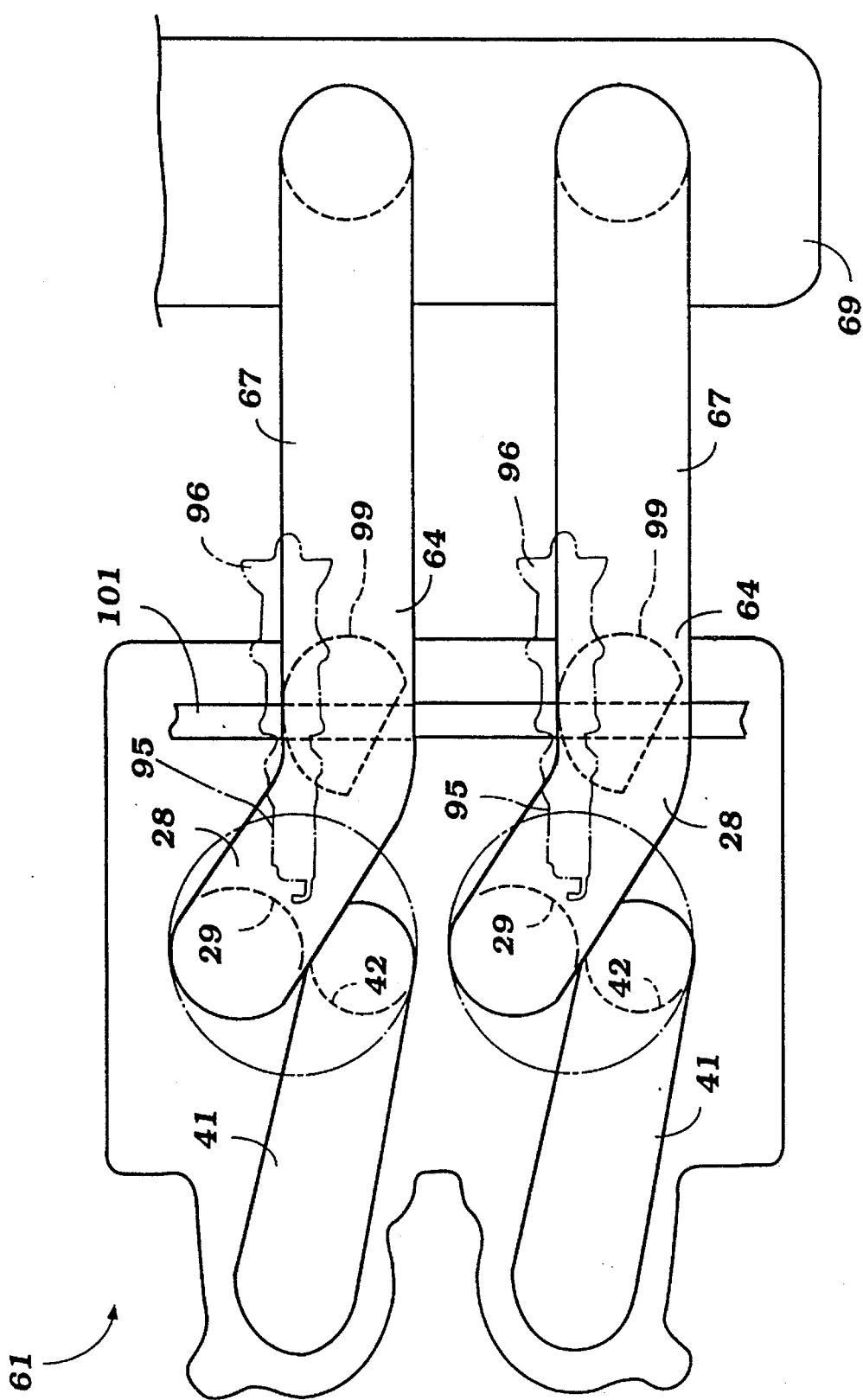
FIG. 10 is a partially schematic top plan view of the embodiment of FIG. 9.

Although, from the foregoing description, it is believed that those skilled in the art can readily understand how the cylinder head 21 and cam cover 61 may be employed in conjunction with any type of conventional engine structure, FIGS. 9 and 10 show a further embodiment of the invention wherein the entire portion of the engine, except for the lower crankcase member and exhaust manifold, are depicted. This embodiment also shows how the cam cover 61, and specifically its intake passages 64, may incorporate flow controlling throttle valves.

This structure will now be described by particular reference to FIGS. 9 and 10, and in these figures, components which are the same as those previously described or substantially the same have been identified by the same reference numerals and will not be described again, except insofar as is necessary to understand the construction and operation of this embodiment. Also, since the construction deals primarily with the intake side, the cross-sectional view of FIG. 9 corresponds to the cross-sectional views of FIGS. 2 and 8 and is taken through the cylinder head intake passages 28.

In FIG. 9, a cylinder block 81 is show partially and in cross-section. This cylinder block 81 has cylinder bores 82 that are aligned with the cylinder head recesses 24. Pistons 83 reciprocate in the cylinder bores 82 and are connected by means of piston pins 84 to the upper or small ends of connecting rods 85. The lower ends of the connecting rods 85 are journaled on the throws 86 of a crankshaft, indicated generally by the reference numeral 87, in a known manner. The crankshaft 87 rotates in a crankcase chamber 88 that is closed by a crankcase member (not shown) that is detachable affixed to a skirt 89 of the cylinder block 81.

The cylinder block 81 has an upper sealing surface 91 that is either sealingly engaged with the cylinder head lower surface 22 around the cylinder bores 82 or a gasket interposed therebetween.

This figure also shows the camshaft, indicated generally by the reference numeral 92, which is journaled in the cam chamber 58 for operating the intake and exhaust valves 33 and 44, as aforedescribed. The camshaft 92 has spaced bearing portions that are journaled on bearing surfaces formed adjacent the cylinder head upper surface 31 and bearing caps 93 that are affixed thereto in a known manner. The camshaft 92 has cam lobes 94 that cooperate with thimble tappets 95 for actuating the valves 33 and 44 in a well known manner.

This figure also shows the spark plugs 95 that are mounted in the cylinder head openings 51 and which have their spark terminals connected to conductor terminals 96 in a well known manner.

Furthermore, this view also shows how the cam cover fuel injector bosses 72 are machined so as to receive fuel injector sockets 97 that receive fuel injectors for injecting fuel into the cam cover intake passages 64 and the intake passages 28 of the cylinder head 21.

From the construction of the cylinder head 21 and its cooperating cam cover 61, it should be apparent that the resulting induction system provides very high charging efficiency. In addition, the configuration permits the length of the intake passages to be tuned so as to obtain optimum performance. However, this high efficiency intake system can result in poor performance at low speeds and low loads due to the slow velocity at which the charge enters the combustion chamber under these conditions.

Therefore, these figures shows another arrangement wherein a flow control valve assembly, indicated generally by the reference numeral 98, may be incorporated into the cam cover 61. This flow control valve arrangement 98 includes butterfly-type control valves 99 having a cut-out configuration, as shown in FIG. 10. Because of this configuration, when the control valves 99 are in a closed position, as shown in FIGS. 9 and 10, the intake charge flowing through the cam cover intake passage 64 and the cylinder head intake passage 28 will be directed toward one side of the intake valve seat 29 and in a direction so as to generate not only a swirl around the axis of the cylinder bores 82 but also a tumble action therearound. Of course, the degrees of swirl and/or tumble can be controlled by controlling the shape of the control valves 99. Thus, by closing the control valves 99 the control valve assembly 98, under some running conditions, then a higher velocity charge will flow into the combustion chambers, and the desired motion can be achieved so as to increase turbulence and improve combustion under these running conditions.

The control valves 99 are affixed to a common control valve shaft 101 that is journaled in the cam cover 61 and which has a servomotor (not shown) affixed to one end thereof for appropriately positioning the control valves 99.

Also, since the control valves 99 are provided in the cam cover 61, the cylinder head can be made simpler and also the control valves 99 can be positioned closer to the valve seats 29 than when they are positioned externally in a separate valve body that is affixed to the cylinder head 21.

As has been noted, the configuration of the intake and exhaust passages permitted by this cylinder head construction permits a fairly compact intake and exhaust system and yet one which can have sufficient length so as to provide the desired tuning. This has particular utility in conjunction with utilization in automotive applications or other applications wherein the engine is provided in an area that has limited space, and FIGS. 11–14 show a number of different embodiments illustrating primarily how the arrangement can be employed in a motor vehicle.

Figure 11:
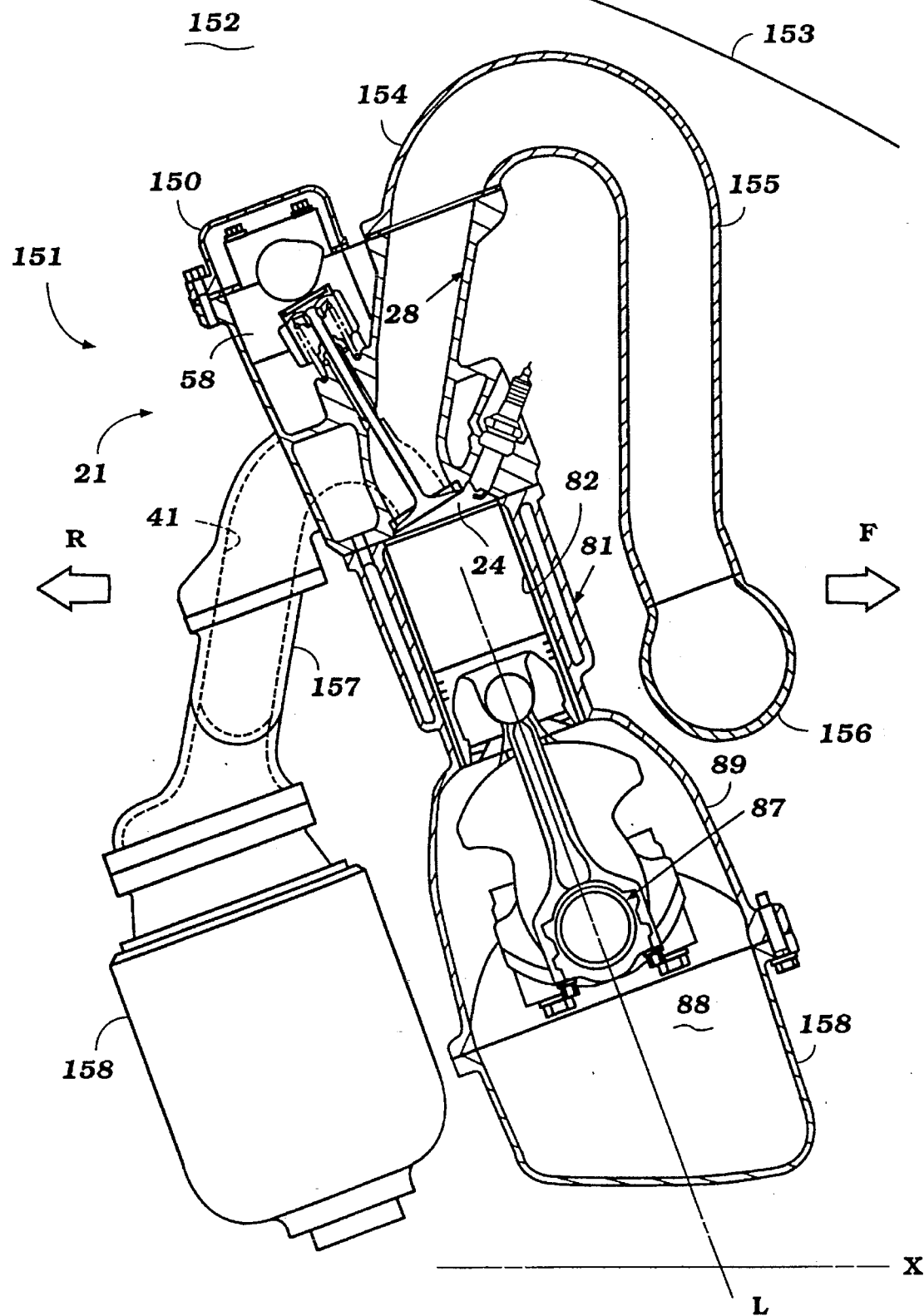
FIG. 11 is a cross-sectional view taken through a single cylinder of an engine constructed in accordance with another embodiment of the invention and shows how the engine may be mounted in the engine compartment of a motor vehicle.

Referring to the first of these embodiments as shown in FIG. 11, an engine, indicated generally by the reference numeral 151, having a general configuration of the type already described, is illustrated in an engine compartment 152 formed by a vehicle body 153. In this embodiment, the engine compartment 152 is formed at the front of the vehicle with the front and rear directions being indicated by the arrows F and R. Obviously rear engine placement is also possible.

The engine 151 is positioned so that the crankshaft 87 rotates about an axis that is disposed transverse to the longitudinal center line of the vehicle having the body 153. This arrangement is particularly useful in conjunction with front wheel drive vehicles. However, it should be also apparent that the arrangement could be utilized with a rear engine, rear wheel drive arrangement.

In this embodiment, a cam cover 152 is affixed to the cylinder head assembly 21 and a separate intake manifold 153 is employed which is formed independently of the cam cover 152. This intake manifold 153 has a plurality of runner sections 154 which have a generally inverted U shape and which extend downwardly adjacent a side of the cylinder block 81 and terminate in a plenum chamber 155 that has an atmospheric air inlet. It should be seen that the axes cylinder bores 82, indicated by the line L, is disposed at an offset angle from the vertical and toward the horizontal axis X to the rear of the engine compartment 152. This permits a compact engine compartment and a low hoodline while maintaining a long intake track.

In this figure, there is also depicted an exhaust manifold 156 which collects the exhaust gases from the cylinder head exhaust passages 41 and delivers them to a catalytic converter 157 that is disposed to the rear of the engine crankcase 88 which is formed, as aforenoted, by the cylinder block skirt 89. In addition, this figure shows the crankcase member 158 affixed to the cylinder block skirt 89 so as to complete the crankcase chamber 88. A suitable atmospheric exhaust system delivers the exhaust gases from the catalytic converter 157 to the atmosphere. This arrangement also permits the catalytic converter 157 to be positioned quite close to the combustion chambers 24 and thus improves its operating efficiency.

Figure 12:
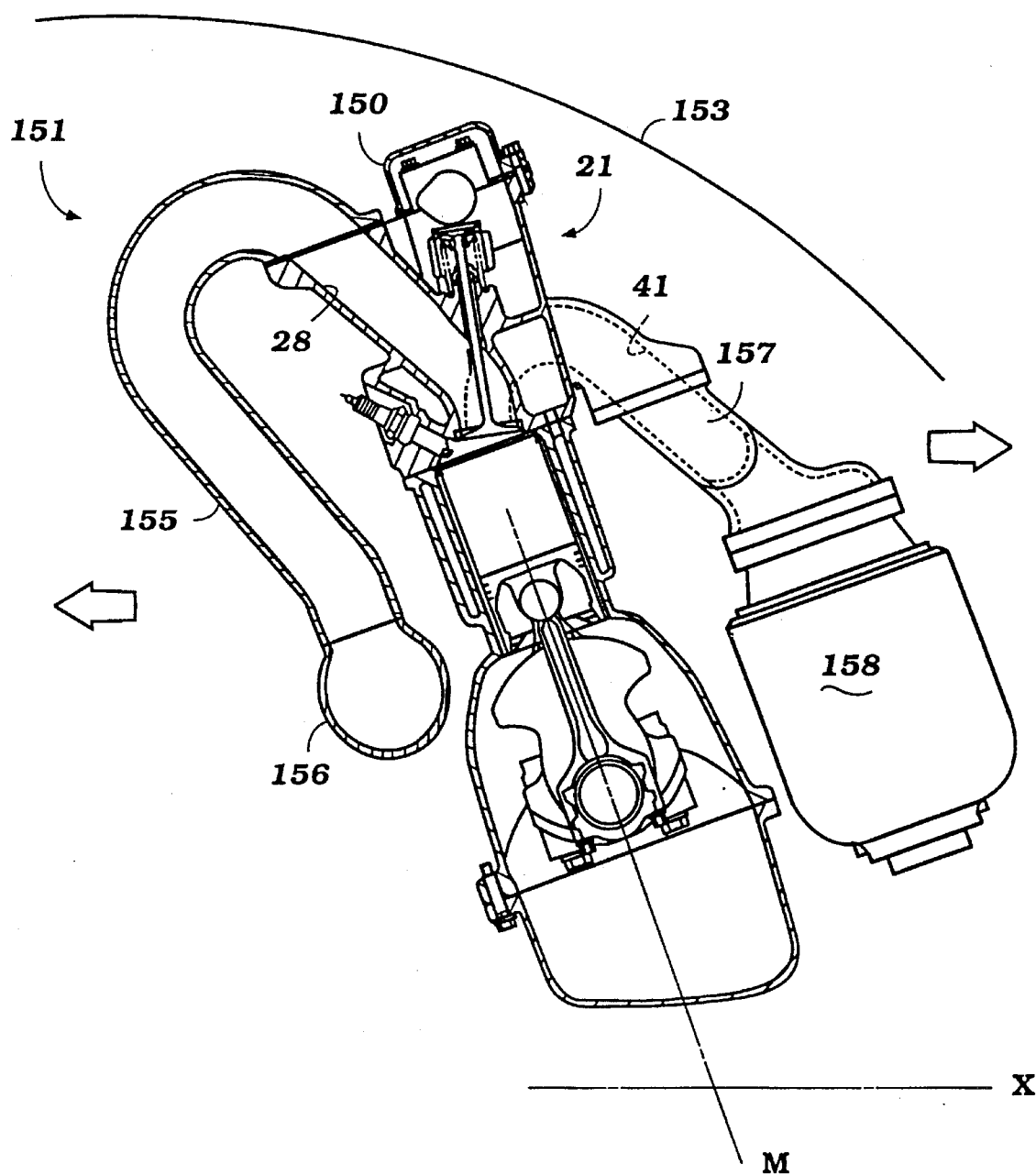
FIG. 12 is a cross-sectional view, in part similar to FIG. 11, and shows another embodiment of the invention as positioned in a motor vehicle engine compartment.

FIG. 12 shows another embodiment of the invention which is generally similar to the embodiment of FIG. 11, but permits the engine 151 to be canted even further toward the horizontal plane X. The cylinder bore axis is canted in a plane M which is greater than that previously described. This is accomplished by reversing the cylinder head 21 on the cylinder block so that the exhaust manifold 156 and catalytic converter 157 is disposed to the front of the engine. Thus, the relatively higher intake manifold runners 154 can have greater height.

Figure 13:
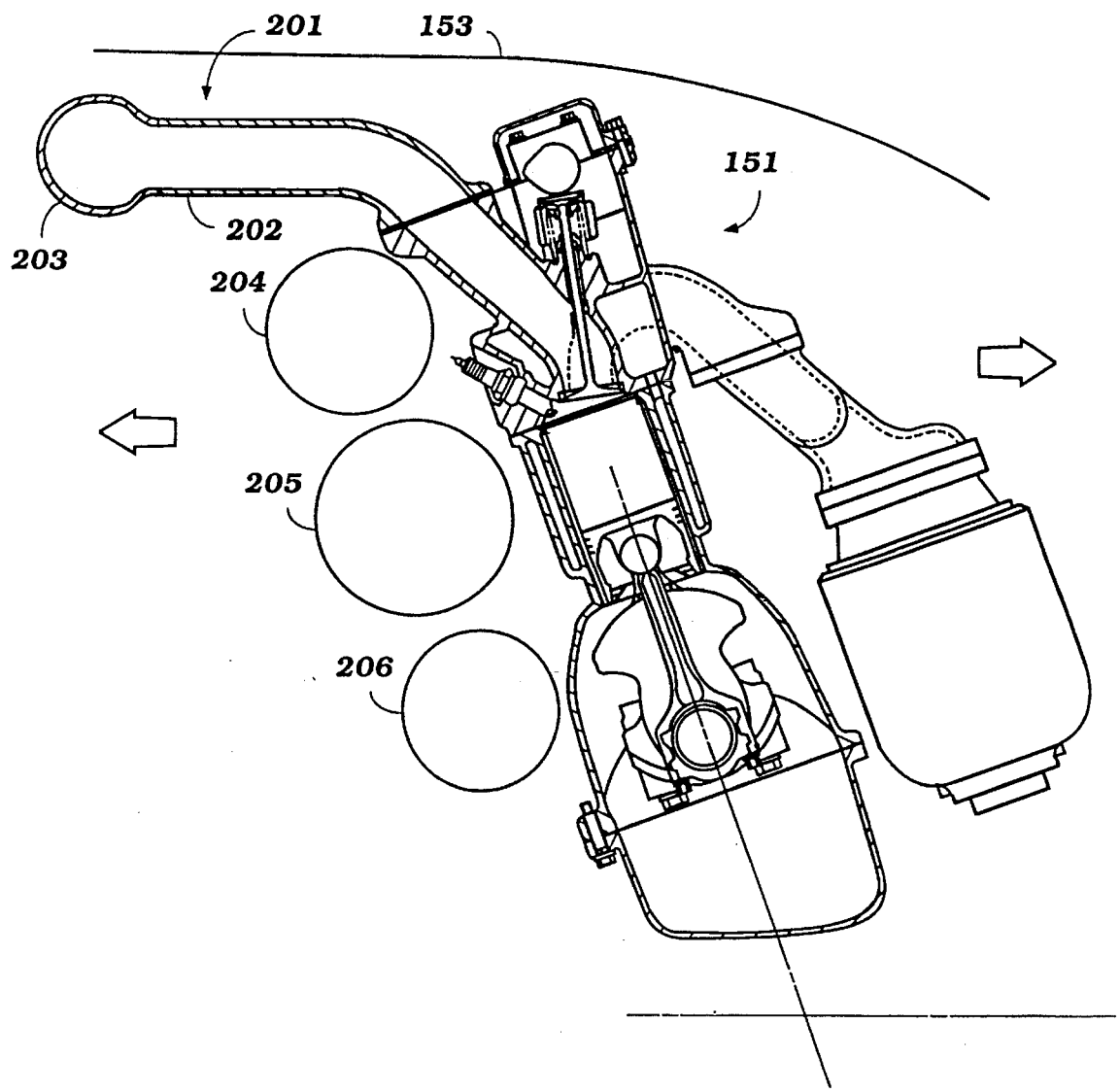
FIG. 13 is a cross-sectional view, in part similar to FIGS. 11 and 12, and shows a still further embodiment of the invention.

FIG. 13 is another embodiment which is generally similar to the embodiment of FIG. 12, in that the induction system, indicated in this embodiment by the reference numeral 201, is disposed rearwardly. However, rather than having the re-entrant portion, the manifold runners 202 extend generally horizontally in line with the body portion 153 and terminate in a rearwardly positioned plenum chamber 203. This opens up the space next to the engine 151 for various accessories driven from the engine crankshaft 87, such as a power steering pump 204, alternator 205, and air conditioning compressor 206. As a result of this arrangement, the engine not only provides maximum space utilization, but there is no sacrifice in the configuration and tuning of the intake and exhaust systems.

Figure 14:
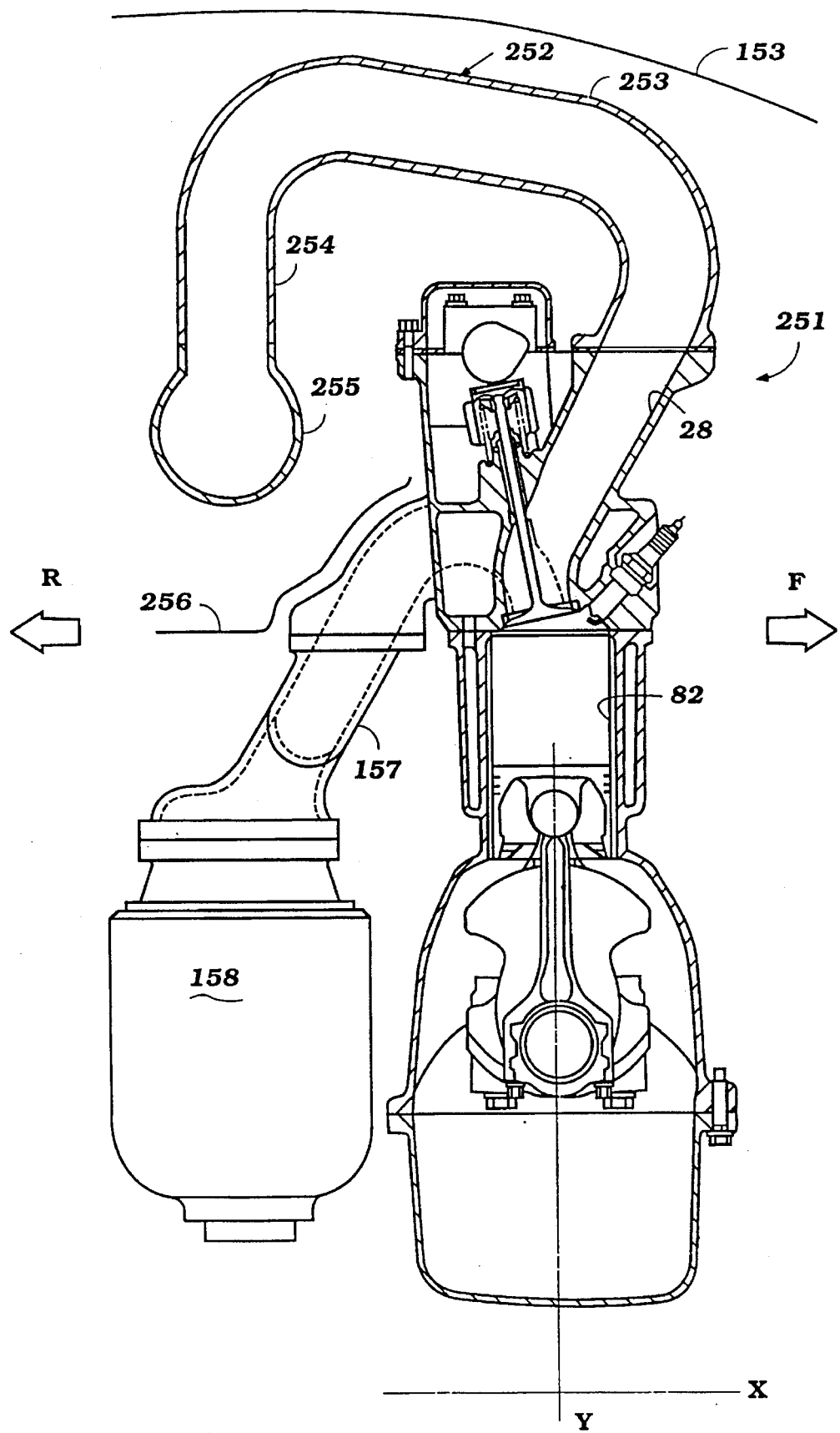
FIG. 14 is a cross-sectional view, in part similar to the embodiments of FIGS. 11–13, and shows another embodiment mounted in the engine compartment of a motor vehicle.

In all of the embodiments previously described, the intake manifold and exhaust manifold have been disposed on opposite sides of the engine. However, other arrangements are also possible, and FIG. 14 shows an engine, indicated generally by the reference numeral 251, where the exhaust and intake manifolds are both positioned on the rear side of the engine in the engine compartment. In this embodiment, the engine is also disposed so that the axis of the cylinder bores 82 lies along the vertical Y axis. The intake system includes an intake manifold, indicated generally by the reference numeral 252, that has runner sections 253 which extend from the cylinder head intake passages 28 upwardly and then rearwardly across the top of the engine to terminate in downwardly extending portions 254 that communicate with the plenum chamber 255. Hence, the plenum chamber 255 is disposed over the exhaust manifold 157 and catalytic converter 158. A heat baffle 256 may be disposed therebetween so as to provide heat insulation of the induction manifold 252 from the exhaust system, and specifically the catalytic converter 158.

Figure 5:
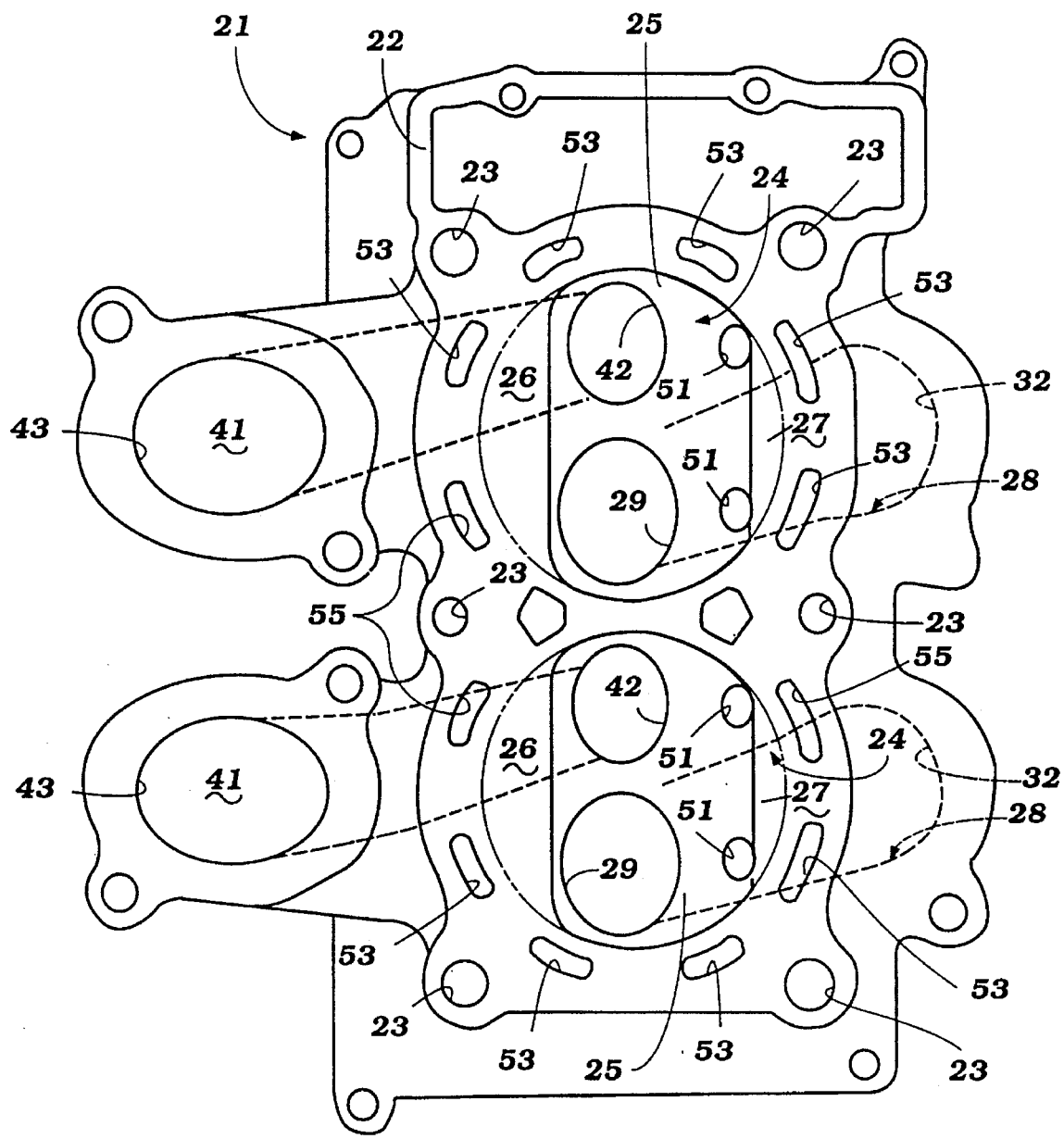
FIG. 5 is a bottom plan view of the cylinder head.
Figure 15:
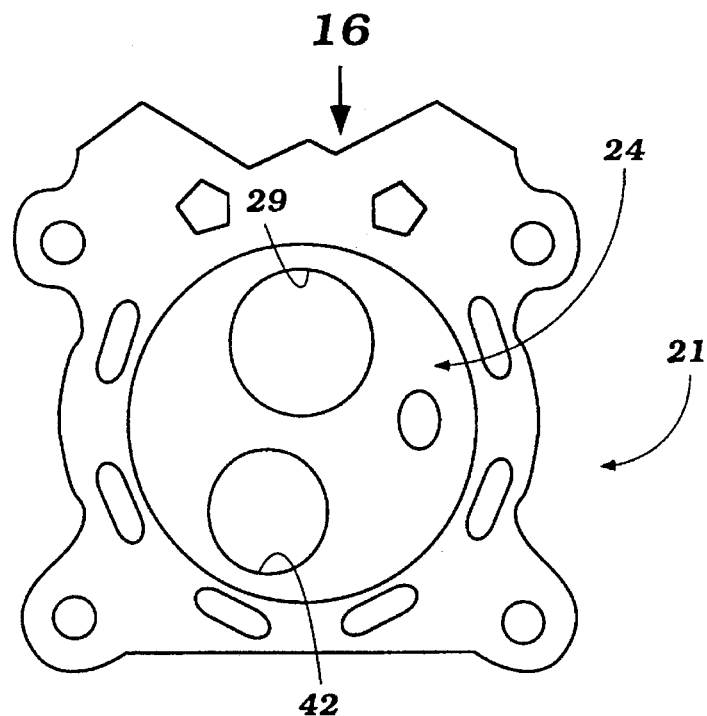
FIG. 15 is a bottom plan view of a portion of the cylinder head showing the combustion chamber recess constructed in accordance with another embodiment of the invention.
Figure 16:
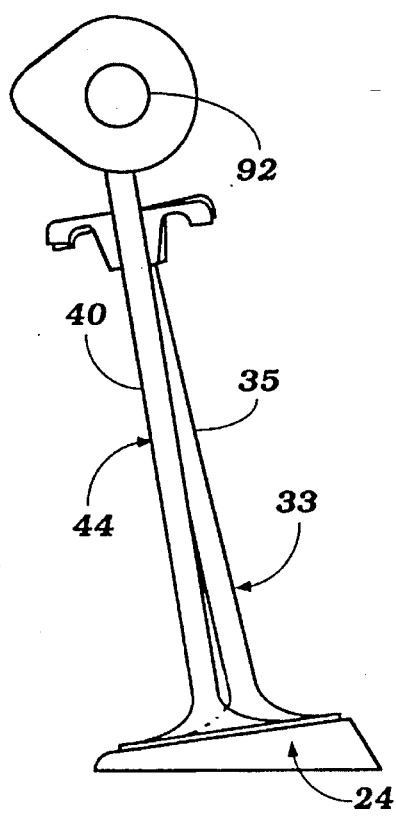
FIG. 16 is a view taken in a direction of the arrow 16 in FIG. 15 and shows how the intake and exhaust valves are placed in this embodiment.

In all of the embodiments as thus far described, the intake and exhaust valves 33 and 44 have been disposed so that the axes of reciprocation defined by their respective stem portions 35 and 46 lie in a common plane. This results in the side-by-side placement of the intake and exhaust valve seats 29 and 42, as shown in FIG. 5. This somewhat reduces the maximum size which the valve head portions 34 and 45 may have. FIGS. 15 and 16 show an embodiment wherein there is a stagger between the valves so as to provide a potential of a larger valve size. In this embodiment, it should be noted that the stems 35 and 46 intersect at the axis of rotation of the camshaft 92.

Figure 17:
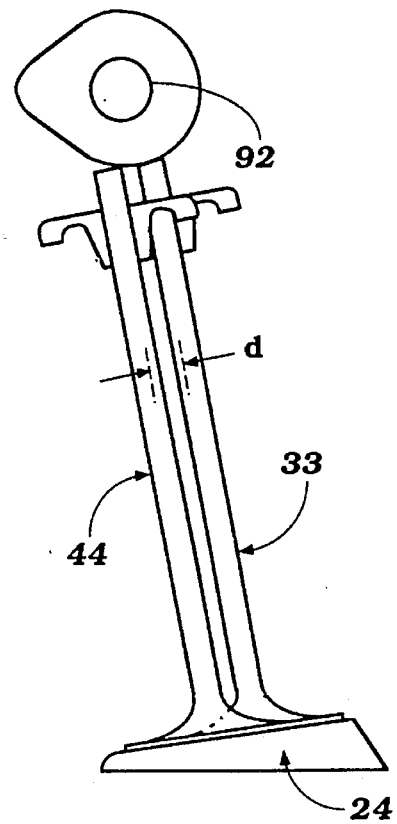
FIG. 17 is a view, in part similar to FIG. 16, and shows another way in which the valves may be placed to arrive at a combustion chamber configuration and porting arrangement as shown in FIG. 15.

FIG. 17 shows another embodiment wherein the axes of reciprocation of the intake and exhaust valves 33 and 44 are maintained parallel, but the axes are offset at a distance d from each other. With this arrangement, it is still possible to employ a single camshaft 92 for operating both the intake and exhaust valves 33 and 34, but the shape of their lobes must be changed to accommodate the offset.

It should be readily apparent from the foregoing description that the described embodiments of the invention provide a relatively simple cylinder head structure wherein machining of the surfaces surrounding the intake and exhaust passages is on the same surface as the upper and lower surfaces of the cylinder head. This reduces setup time and has other advantages as aforenoted. Of course, the foregoing description is that of preferred embodiments of the invention, and various changes and modifications may be made without departing from the spirit and scope of the invention, as defined by the appended claims.

We claim:

1. A cylinder head assembly for an internal combustion engine comprised of a cylinder head having a lower surface for sealing engagement with a cylinder block having a cylinder bore closed by said cylinder head lower surface to form a combustion chamber, said cylinder head having an upper surface surrounding a valve chamber adapted to be closed by a valve cover sealingly engaged with said upper surface, an intake passage extending through said cylinder head from an intake port in said combustion chamber to an inlet opening surrounded by a sealing surface coplanar with said upper surface and sealingly engaged by said valve cover, an intake passage formed in said valve cover cooperating with said cylinder head intake passage, and a flow-controlling valve positioned in said valve cover for controlling the flow through said valve cover and said cylinder head intake passages.

2. The cylinder head assembly of claim 1, wherein the cylinder head is provided with a plurality of intake passages and the valve cover has a plurality of intake passages, each cooperating with a respective one of the cylinder head intake passages.

3. The cylinder head assembly of claim 2, wherein the control valves comprise butterfly type valves all affixed to a common valve shaft journaled within the cam cover.

* * * * *